United States Patent
Fink

(10) Patent No.: US 9,302,446 B2
(45) Date of Patent: Apr. 5, 2016

(54) SKIN-STIFFENED COMPOSITE PANEL

(71) Applicant: AIRBUS HELICOPTERS DEUTSCHLAND GMBH, Donauworth (DE)

(72) Inventor: Axel Fink, Donauworth (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 57 days.

(21) Appl. No.: 14/515,805

(22) Filed: Oct. 16, 2014

(65) Prior Publication Data

US 2015/0118436 A1 Apr. 30, 2015

(30) Foreign Application Priority Data

Oct. 28, 2013 (EP) ..................................... 13400024

(51) Int. Cl.
| | | |
|---|---|---|
| *B64C 1/06* | (2006.01) | |
| *B32B 5/18* | (2006.01) | |
| *B29D 99/00* | (2010.01) | |
| *B32B 37/18* | (2006.01) | |

(52) U.S. Cl.
CPC ............... *B32B 5/18* (2013.01); *B29D 99/0014* (2013.01); *B32B 37/18* (2013.01); *B32B 2605/18* (2013.01); *Y10T 428/233* (2015.01)

(58) Field of Classification Search
CPC ........ B64C 1/064; B64C 1/12; B29C 70/446; F16S 1/14; Y10T 428/2457; Y10T 428/24182
See application file for complete search history.

(56) References Cited

U.S. PATENT DOCUMENTS

| | | |
|---|---|---|
| 4,452,657 A | 6/1984 | Hamm |
| 7,097,731 B2 | 8/2006 | Puriefoy et al. |
| 2002/0189195 A1 | 12/2002 | McKague, Jr. et al. |
| 2004/0103973 A1 | 6/2004 | Carstensen et al. |
| 2009/0309264 A1 | 12/2009 | Cavaliere |
| 2011/0311778 A1 | 12/2011 | Burpo et al. |

FOREIGN PATENT DOCUMENTS

| | | |
|---|---|---|
| DE | 10009106 | 6/2001 |
| DE | 102008057247 | 1/2010 |
| EP | 1145828 | 10/2001 |

OTHER PUBLICATIONS

Extended European Search Report for EP 13400024.9, Completed by the European Patent Office on Apr. 16, 2014, 4 Pages.

*Primary Examiner* — Alexander Thomas

(74) *Attorney, Agent, or Firm* — Brooks Kushman P.C.

(57) ABSTRACT

A skin-stiffened composite panel (1) comprising at least two essentially longitudinal stiffeners (3) arranged distant to each other in a plane with a skin (2) of a planar outer continuous composite layer (9) and an inner continuous composite layer (10). The at least two essentially longitudinal stiffeners (3) have a height "a" perpendicular to the skin (2). At least two sandwich assemblies (4) in said plane are along each one of the at least two essentially longitudinal stiffeners (3), said at least two sandwich assemblies (4) comprising each the planar outer and the inner continuous composite layers (9, 10) and a grid-type foam module (8) with openings and with a height "b", with the foam modules (8) on the same side of the planar outer continuous composite layer (9) as the essentially longitudinal stiffeners (3) between the inner continuous composite layer (10) and the planar outer continuous layer (9).

7 Claims, 8 Drawing Sheets

SKIN-STIFFENED COMPOSITE PANEL

CROSS REFERENCE TO RELATED APPLICATION

This application claims priority to European patent application No. 13 400024.9 filed on Oct. 28, 2013, the disclosure of which is incorporated in its entirety by reference herein.

BACKGROUND OF THE INVENTION (1) Field of the Invention

The invention relates to a skin-stiffened composite panel with the features of the preamble of claim 1.

(2) Description of Related Art

Aircraft composite structures make use of sandwich designs or skin-stiffened designs. Sandwich designs are typically built of three main constituents: two thin, strong and stiff continuous cover sheets adhesively bonded to each side of a thick core which is considerably weaker and less dense than the cover sheets.

Skin-stiffened designs feature a monolithic skin which is stiffened by longitudinal elements (often denoted as stringers). The stiffeners are either mechanically (riveted), adhesively (bonded or co-bonded) or cohesively (co-cured) attached to the skin, the skin being usually thinner in comparison to the stiffener thickness. The region between the stiffeners is denoted as "bay".

Monolithic skin-stiffened panels are known to allow for large load bearing capabilities within a post-buckling regime (after buckling of the shear and/or compression loaded skin between the longitudinal stiffeners). The buckled skin excites however large stresses on the main load bearing members and the stiffeners. For metallic panels the operation within a post-buckling regime is not a concern and typical aircraft structures are designed according to the strength capabilities within that regime.

Typically, buckling of the bay skin confined between stiffeners of metallic panels is even allowed below limit load to a specific extent. For composite materials however and especially when having a highly integral design with co-cured, co-bonded or secondary bonded elements, a skin-stiffened design should not be allowed to reach bay skin buckling below limit load, especially for helicopter applications. This is due to the high vibration environment of helicopters considerably increasing the risk of fatigue and damage propagation during a repeated operation beyond the buckling threshold. Skin buckling excites detrimental peeling stresses within the skin-stiffener interface, said peeling stresses being a serious source of delamination. As a result, monolithic skin-stiffened panels require smaller stiffener spacing or/and thicker skins which translates to penalties in terms of the weight efficiency.

Typical composite sandwich designs represent an effective alternative to the skin-stiffened panels enabling a design with large load bearing capabilities before buckling. Sandwich panels are usually not allowed to buckle (or fracture) below ultimate load, since buckling (and local fracture) leads to total structural collapse. Composite sandwich designs are usually (and especially for high load levels) more effective than skin-stiffened designs, as long as post-buckling is not allowed for a skin-stiffened design. However, a sandwich design shows some drawbacks in terms of manufacturing costs, integration, repair, damage tolerance, inspection and operation which make relative their apparent efficiency.

Sandwich designs outstand by their very high bending-stiffness-to-weight and bending-strength-to-weight ratio as well as by a smooth and even shape due to the continuous support of both skins. An additional advantage of sandwich designs is the high thermal insulation in comparison to skin-stiffened designs. The high bending stiffness capabilities of sandwich designs enable large panel dimensions without the need of additional stiffeners. However, sandwich panels are characterized by important drawbacks.

The use of additional adhesive films, minimal thickness requirements (arising from handling, quality and moisture absorption issues), additional hermetic foils, ramp pad-ups and local reinforcements using potting compound reduce the weight efficiency of sandwich panels. The temperature sensitivity related to the adhesive and the core material reduce the operational spectrum. Joining requires heavy inserts and local reinforcements; a later implementation of additional load introduction or attachment points represents a considerable effort. Moreover, the damage resistance and the damage tolerance of sandwich panels with continuous cover sheets are deficient. Especially under fatigue, acoustic, compressive and out-of-plane loading, delaminations caused by an impact tend to propagate all along the interface between the core and the cover sheets leading to important reductions of the panel's residual strength.

The suitability of automatic fiber placement techniques for the manufacturing of typical chamfered sandwich panels is limited. This is due to specific lay-up process issues associated to the ramp geometry and the out-of-plane movement of the roller during lay-up bridging the considerable offset between both facesheets (which is given by the core height, typically ranging between 10 and 20 mm). Typical sandwich panels feature a core made either of cellular (composite or metallic) materials (i.e. honeycomb) or foam materials (i.e. PMI=Polymethacrylimide). Foam materials are usually heavier and less stiff than honeycombs within typical core thickness ranging between 10 and 20 mm.

For lower core thicknesses below 5 mm however, the foam cores can lead to lower overall structural weights than typical honeycombs despite their larger density. This is due to the fact that honeycombs require additional adhesive film layers, whereas foam cores do not necessarily require additional adhesives, especially when using infusion techniques or prepregs with high resin content and corresponding bleeding characteristics.

Contrary to sandwich designs, the panels of skin-stiffened designs feature an easy integration—à posteriori as well—of attachment points, which are typically arranged at the longitudinal stiffeners and show a lower temperature and moisture sensitivity. The quality inspection and repair of said skin-stiffened designs are comparatively easy to process.

However, special attention has to be paid at the interface between the strong stiffeners and the thin skin, especially when adhesively or cohesively coupled, since this interface is prone to delaminate initiating structural damage. This is the reason why composite skin-stiffened designs should not be allowed to reach bay skin buckling during operation, especially when having a high frequency of high load cycles and a high vibration environment as it is the case for helicopter applications. This requirement considerably decreases the weight efficiency of skin-stiffened panels. Skin-stiffened panels are deemed to be more cost-efficient in comparison to sandwich designs, since structural bonding can be fully eliminated, and joining can be accomplished by simple standard means. Moreover, the damage resistance is better, since the skin is thicker and locally more flexible than in the case of a sandwich.

The document DE 10 2008 057 247 B3 discloses a panel having stringers with a hat profile fitted on a skin, where the stringers have an axis in a longitudinal direction, width in a transverse direction and a height as distance of the skin. One of the stringers with the hat profile exhibits a surface curved in a direction of the axis and in the transverse direction. The largest width of the hat profile in the transverse direction of the stringer is set between two adjacent frames. A rib is arranged in a closed area, which is formed between the skin and an internal surface of the stringer.

The document U.S. Pat. No. 7,097,731 B2 discloses a method of manufacturing a hollow section grid-stiffened panel comprising a tool having a surface. The stiffened skin composite panel is preassembled comprising laminating a composite outer skin on the surface, placing a separator outer layer on the composite outer skin, and laminating a composite stiffener on the mandrel, the mandrel being positioned on the separator layer, wherein the separator layer separates the stiffener and the mandrel from the outer composite skin.

The preassembled outer skin composite panel is cured on the tool. The separator layer and mandrel are removed from the preassembled stiffened skin composite panel. The stiffened skin composite panel is reassembled, comprising applying an adhesive between the composite outer skin and the composite stiffener. The reassembled stiffener skin composite panel is cured on the tool to bond the stiffener skin to the outer skin.

The document U.S. Pat. No. 4,452,657 A discloses an "I" beam or web structures of laminated composite material or sheets being stiffened by transverse webs stiffeners having a tubular configuration with flattened end portions. The flattened end is inserted between the laminated web material or sheets and cured therewith to form an integral stiffened web structure.

The document US 2002/0189195 A1 discloses an uncured, thermoset resin sheet reinforced with oriented fibers and is slit to define a desired length for the fibers. A series of the sheets are cut and stacked to form integrated layers of the composite material for a structural panel. The panel has two outer layers that sandwich two shorter layers on each end, and syntactic or foamed resin layer in between. Each of the composite layers is formed from the same materials and by the same process, but may vary in the directional orientation of their fibers.

The uncured panel is assembled into a flexible, substantially flat configuration is heated and formed to the contours of a tool having an undulated surface geometry. The panel is further heated to cure the combined composite and syntactic resins into a series of undulations that permeate each of its layers. In one embodiment, the undulations are in a smooth, sine wave-like pattern that allows the panel to maintain a planar configuration. Although the fibers themselves do not stretch, the short lengths of the fibers enable stretching of the material in the fiber direction so that deformation of the composite is possible in all directions. The panel is stiffened both by spacing its outer layers apart with the syntactic layer and by its undulated surface.

The document US 2009/0309264 A1 discloses a stiffened panel made of a composite with a skin and at least one stiffener having a more or less closed volume. In order for the fibers of the composite to be held in place during fiber deposition and during pressure application while the resin of the composite is being cured, a molding core is placed between the fibers at the position of the more or less closed volume of the stiffener. The molding core includes a flexible bladder filled with a granular solid material, the thermal expansion coefficient of which is close to that of the composite used to produce the stiffened panel. The pressure in the bladder is increased before the composite is cured, so as to compensate for the forces applied for compressing these fibers during production of the panel.

The document US 2011/0311778 A1 discloses a beaded composite panel fabricated using composite plies. An opening is formed in each of plies, and each ply is laid up on a bead feature and drawn down over the bead feature in the area of the opening so as to widen the opening into a gap allowing the ply to conform to the contour of the bead feature. Patches are fabricated and placed on the plies overlying over the openings. The laid-up plies are compacted and cured.

BRIEF SUMMARY OF THE INVENTION

The object of the invention is to provide a skin-stiffened composite panel with improved mechanical and operational properties and improved weight efficiency capabilities without entering a post-buckling regime whilst allowing for a good damage tolerance, easy manufacturability, especially for automatic fiber placement techniques, and repair. It is a further object of the invention to provide a method for manufacturing such a panel.

A solution is provided with a skin-stiffened composite panel with the features of claim 1 of the invention. A further solution is provided with a method for manufacturing such a panel with the features of claim 7 of the invention.

According to the invention a skin-stiffened composite panel extends essentially along a plane, i.e. a plane with a cylindrical or spatial curvature >1 m or a plane with a cylindrical curvature of about 0.2-1 m for a tube of a tailboom of a helicopter. Said panel comprises at least two essentially longitudinal stiffeners arranged distant to each other in said plane and further comprises a skin made of an essentially planar outer continuous composite layer and an inner continuous composite layer.

The at least two essentially longitudinal stiffeners are bonded unilaterally to the same side of the inner continuous composite layer of the skin. Said panel further comprises at least two sandwich assemblies provided in said plane along opposed sides of each one of the at least two essentially longitudinal stiffeners, said at least two sandwich assemblies comprising each the essentially planar outer continuous composite layer and the inner continuous composite and a foam module, with the foam module on the same side of the planar outer continuous composite layer as the essentially longitudinal stiffeners and between essentially planar outer continuous composite layer and the inner continuous composite.

The foam modules each have a thickness b<3.5 mm, perpendicular to the essentially planar outer continuous composite layer. The at least two essentially longitudinal stiffeners have a height a>3b perpendicular to the essentially planar outer continuous composite layer of the skin. Each foam module has a grid-type structure with polygonal through-openings confined by flat ribs along two directions in said plane, the width c of the flat ribs being at least 5 times larger than their thickness b. The essentially planar outer continuous composite layer and the inner continuous composite are connected to each other within all of the through-openings of each foam module and along at least two interstices between the at least two sandwich assemblies thus providing locally the skin. Each one of the at least two essentially longitudinal stiffeners on the skin bridge an interstice between the at least two sandwich assemblies.

The invention is characterized by the following features:

The inventive skin-stiffened composite panel represents an integral skin-stiffened design combined with a sandwich design. The sandwich design is confined to the bay between the longitudinal stiffeners. The sandwich design is grid-type using foam, especially without any additional film adhesive.

The integral skin-stiffened design is composed of a skin and longitudinal stiffeners. The longitudinal stiffeners feature for instance an Omega, Hat, T, H, L, TL or any other typical cross section shape for stiffeners. The longitudinal stiffeners are adhesively, preferably cohesively coupled to the skin. The sandwich total thickness is considerably less, at least 5 times less, than the height of the longitudinal stiffeners.

The skin features a planar outer and an inner continuous composite layer made of a plurality of individual unidirectional plies, either preimpregnated or dry. At least one foam module is provided per bay, said at least one foam module being arranged between the inner and the planar outer continuous composite layer. Continuous means, that the inner and planar outer continuous composite layers cover each other without voids.

The foam modules provide for the grid type sandwich design, which is a net-type structure with flat ribs running along two directions, preferably orthogonal to each other. Hence, the foam module shows polygonal openings. The width c of the ribs is considerably larger, i.e. at least 5 times than their thickness b. The thickness b of the foam module is less than 3.5 mm.

The foam modules are arranged between the inner and the planar outer continuous composite layers to provide the sandwich assemblies. Both the inner and the planar outer continuous composite layers of the skin are coupled to each other within the region where the longitudinal stiffeners are arranged and as well in the region of the polygonal openings of the foam modules.

According to a preferred embodiment of the invention the skin is manufactured by automatic fiber/tow placement. The foam modules are placed on top of the planar outer continuous composite layer. The inner continuous composite layer is laid-up on top of the foam/planar outer continuous composite layer assembly, so that the inner continuous composite layer adopts the grid-type structure of the foam modules. Finally, the longitudinal stiffener preforms are placed on the monolithic areas of the skin and the skin-stiffened composite panel is cured.

The inventive skin-stiffened composite panel allows advantages in terms of manufacturing facing automatic fiber placements. The lay-up of each tow of the inner continuous composite layer during that automatic fiber placement process allows to accommodate each tow into the polygonal openings of the foam modules thus avoiding wrinkles as generated by a flat continuous fabric of the state of the art on top of foam modules as said flat fabrics of the state of the art do not allow to be draped into the grooves without distortions.

So, the inner continuous composite layer does not need any preshaping but is molded during the automatic fiber placement by the geometry of the foam modules to fit into the openings of the foam geometry, on the ribs of the foam modules and on the outer continuous composite layer without any voids. The relatively thin thickness b of the foam module allows the tows to drape within the openings just by the elastic deformation of the roller head of the fiber placement machine hence fully exploiting the process advantages of the automatic fiber placement technique.

In a preferred embodiment of the invention, no additional adhesive layer is used between the inner and outer continuous composite layers and the foam surfaces.

In a further preferred embodiment of the invention, the flat ribs of the foam modules are oriented at +/−45° with respect to the stiffeners' longitudinal direction.

In a second embodiment of the invention, the flat ribs are oriented at 0° and 90° with respect to the stiffeners longitudinal direction.

Advantages of the Invention

The inventive skin-stiffened composite panel combines the advantages of a skin-stiffened and a sandwich design with a reduced sandwich height, since the sandwich is confined between longitudinal stiffeners with typical distances of 130 to 250 mm between each other. The overall stability behavior of the inventive skin-stiffened composite panel is dominated by the longitudinal stiffeners whereas the local buckling behavior of any of the bays between the longitudinal stiffeners is dominated by the sandwich design.

The inventive skin-stiffened composite panel exploits the advantages of a typical skin-stiffened design in terms of joining, damage tolerance, inspectability, environmental robustness and costs whilst avoiding a post-buckling regime, deemed critical for composite skin-stiffened designs. These advantages translate to an improved weight-efficiency of the inventive skin-stiffened composite panel in comparison to sandwich designs. Weight efficiency improvements of about 10% have been evaluated for specific structural applications of the inventive skin-stiffened composite panel with an equivalent overall stability behavior against compressive and/or shear loads.

a. The required height of the sandwiches between the longitudinal stiffeners is 5 to 10 times less than a full sandwich design. This reduced height allows avoiding the penalties of typical chamfered sandwich designs enabling automatic fiber placement processes and coupling the inner and outer continuous composite layers to the skin through the polygonal openings of the grid-type foam modules.

b. thicknesses of 2 mm of the grid-type foam modules—in combination with appropriate edge chamfering—are considered suitable for automatic fiber placement processes without the need of introducing complex roller kinematics: the inherent elasticity of the compaction roller alone enables a smooth draping of the individual tows for the plies of the continuous composite layers along the grid-type foam modules of the sandwiches.

c. The grid-type foam modules of the sandwich with the ribs oriented at +/−45° with respect to the stiffeners longitudinal direction provide for an optimal stabilization against compressive and/or shear loads of the respective bays between the longitudinal stiffeners. The coupling of the inner and planar outer continuous composite layers to form the skin as well in the polygonal openings of the grid-type foam modules ensures a good damage tolerance behaviour of the inventive skin-stiffened composite panel, since there is no risk of entire separation of these continuous composite layers from the grid-type foam modules in case of damage.

d. foam module thicknesses below 3.5 mm lead to lower structural weights in comparison to using honeycombs, since there is no necessity of additional adhesive layers between the core surfaces and the cover layers. Besides, honeycomb cores are not really feasible for such low thicknesses, since they are susceptible to core crush. The low thickness of the foam modules of the inventive skin-stiffened composite panel in combination with the grid-type structure allows—to a certain extent—for a good adaptation of the preferably machined in flat foam to curved surfaces of the inventive skin-stiffened composite panel.

BRIEF DESCRIPTION OF THE SEVERAL VIEWS OF THE DRAWINGS

A preferred embodiment of the invention is presented by means of the following description with reference to the attached drawings.

DETAILED DESCRIPTION OF THE INVENTION

Figure 1:
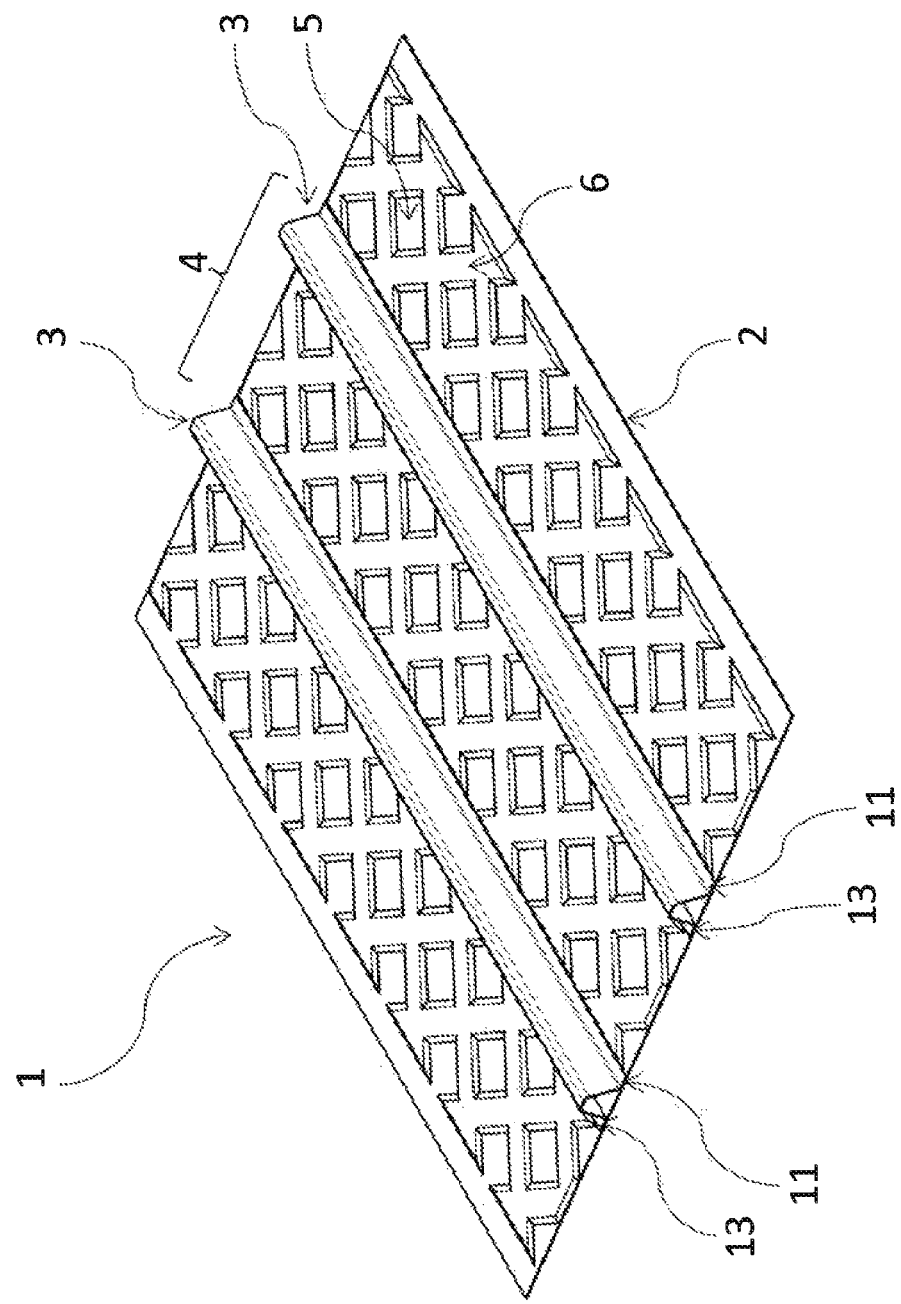
FIG. 1 shows a perspective view of a panel according to the invention.

According to FIG. 1 a skin-stiffened panel 1 is provided with a continuous skin 2 and two longitudinal stiffeners 3 along a common plane. The two longitudinal stiffeners 3 each have an "Omega" cross section and the two longitudinal stiffeners 3 are mounted unilaterally to one side of the continuous skin 2 with a constant distance of 130-250 mm between each other. The skin-stiffened panel 1 is essentially planar including cylindrical or spatial curvatures with radii >1 m.

Two grid-type sandwich assemblies 4 are aligned outside and one grid-type sandwich assembly 4 between the longitudinal stiffeners 3. The grid-type sandwich assemblies 4 have flat ribs 6 and polygonal openings 5.

The two longitudinal stiffeners 3 are turned with the open side of their respective "Omega" cross section towards the continuous skin 2 and left and right L-shaped base flanges 11, 13 at the open side of each "Omega" cross section are in planar adhesive contact with the skin 2 along the entire length of each of the two longitudinal stiffeners 3 forming interstices of monolithic areas 7 between the three sandwich assemblies 4 for the at least two essentially longitudinal stiffeners 3. Each of the "Omega" cross sections has a height of up to 22 mm from the common plane.

Figure 2:
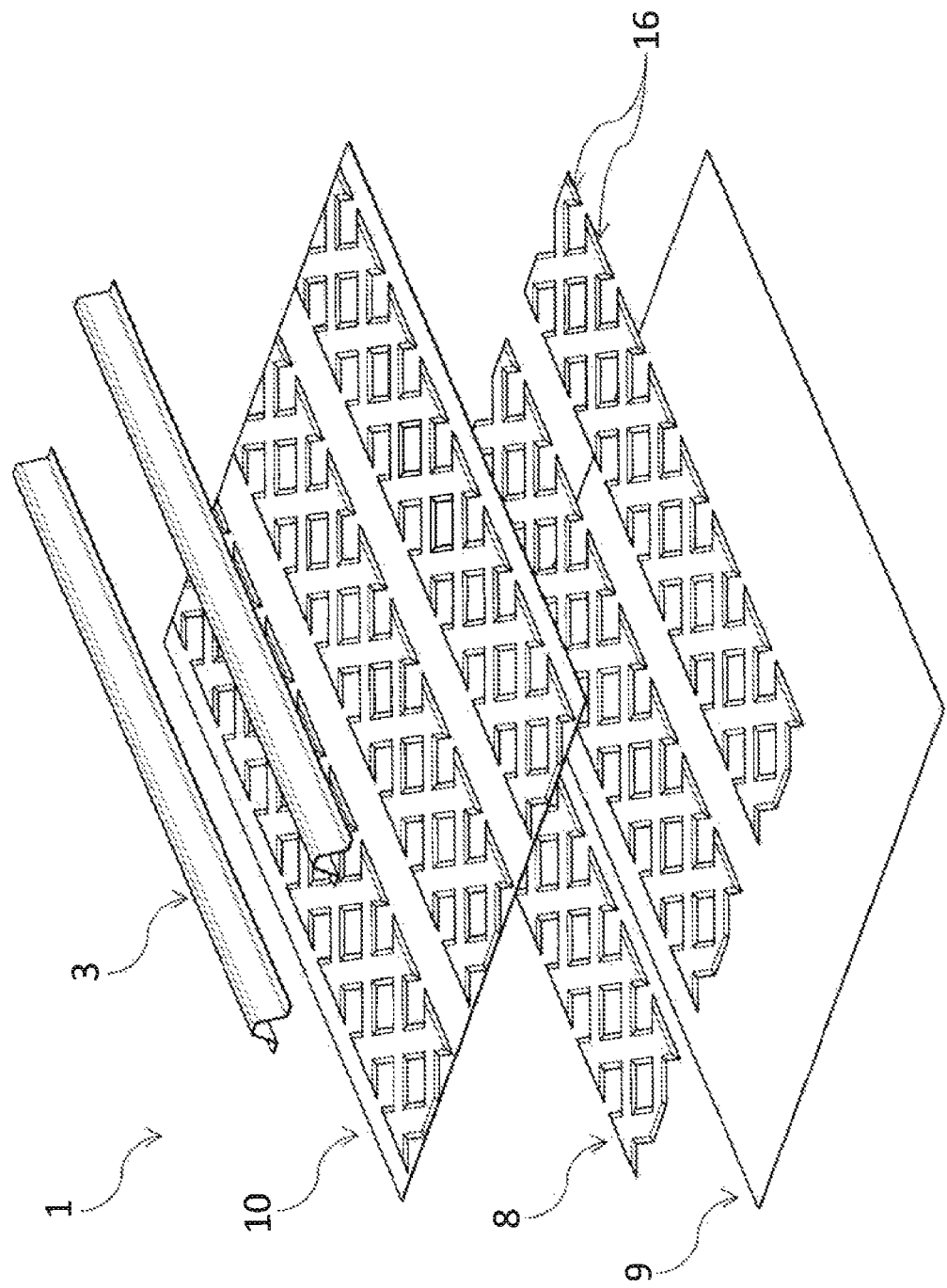
FIG. 2 shows an exploded view of elements of the panel according to FIG. 1 after completion.

According to FIG. 2 corresponding features are referred to with the references of FIG. 1. The skin 2 of the skin-stiffened panel 1 comprises an inner continuous composite layer 10 and an essentially planar outer continuous composite layer 9 with respective sizes for mutual coverage.

Three essentially rectangular foam modules 8 are provided parallel to each other in the common plane for respective alignment between and outside along the two longitudinal stiffeners 3. The foam modules 8 are provided with chamfered edges 16.

Figure 3:
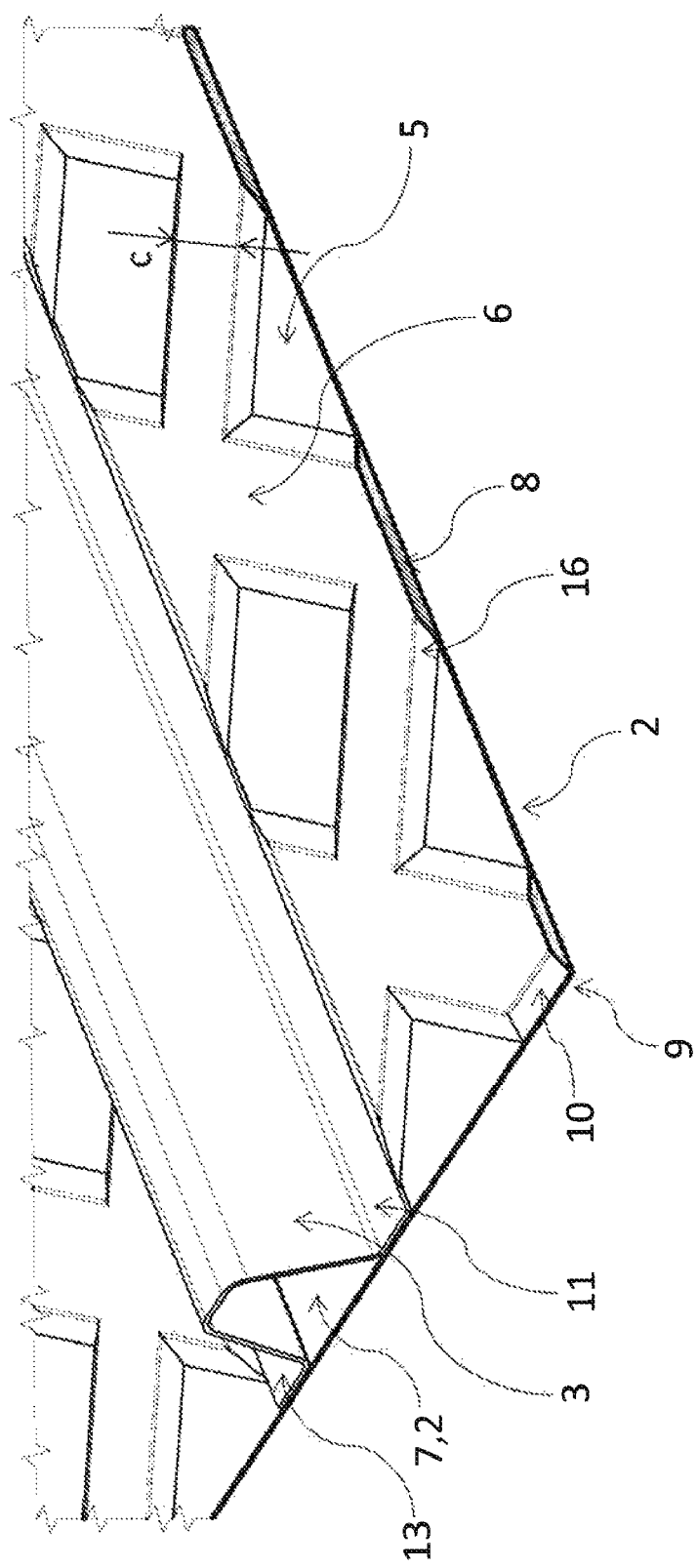
FIG. 3 shows a perspective view at a larger scale of a partly cut section of the panel according to the invention.

According to FIG. 3 corresponding features are referred to with the references of FIG. 1, 2. The inner continuous composite layer 10 and the planar outer continuous composite layer 9 of the skin 2 are coupled to longitudinal monolithic areas 7 below and inside between the right and left L-shaped base flanges 11, 13 at the open side of each "Omega" cross section along each of the longitudinal stiffeners 3 of the skin-stiffened panel 1.

The inner continuous composite layer 10 and the planar outer continuous composite layer 9 of the skin 2 are each coupled to opposed inner and outer sides of the foam modules 8 along the common plane and along the chamfered edges 16 for provision of the grid-type sandwich assemblies 4. The inner continuous composite layer 10 and the planar outer continuous composite layer 9 of the skin 2 are coupled to each other to monolithic bay portions in the polygonal openings 5 of the grid-type sandwich assemblies 4 with the flat ribs 6 of the foam modules 8 between. The flat ribs 6 of the foam modules 8 each have a width c=20 mm about as big as the height of the "Omega" cross sections of the longitudinal stiffeners 3. The polygonal openings 5 are 2-5 times as large as the width c.

Figure 4:
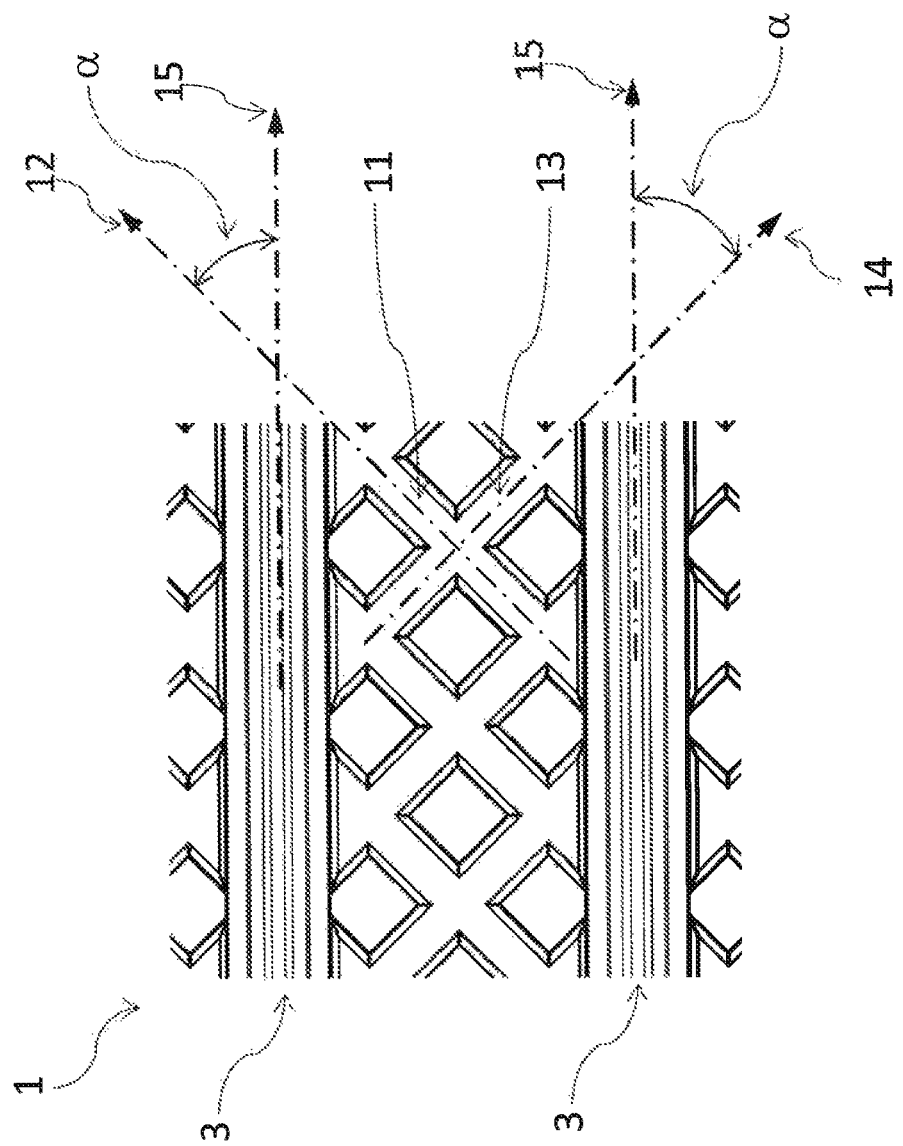
FIG. 4 shows a top view at a larger scale of a section of the panel according to the invention.

According to FIG. 4 corresponding features are referred to with the references of FIGS. 1-3. The longitudinal stiffeners 3 are parallel to each other in their longitudinal direction 15 and the flat ribs 6 of the foam module 8 of the grid-type sandwich assemblies 4 are traverse in a first angled direction 12 and a second angled direction 14 with regard to this longitudinal direction 15. The angle α between the first angled direction 12 and the second angled direction 14 of the flat ribs 6 and the longitudinal direction 15 is +/−45°.

Figure 5A:
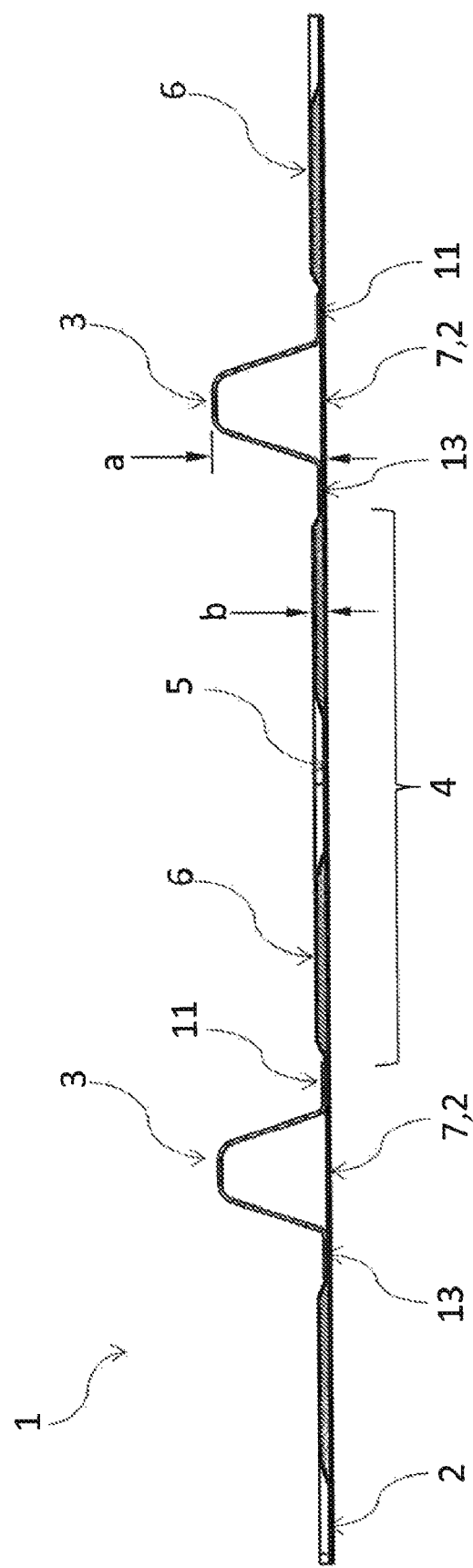
FIG. 5A shows a cross sectional view at a larger scale of a section of the panel according to the invention.

According to FIG. 5A corresponding features are referred to with the references of FIGS. 1-4. The skin-stiffened panel 1 is provided with two longitudinal stiffeners 3 with "Omega" cross section. The inner continuous composite layer 10 and the planar outer continuous composite layer 9 form the longitudinal monolithic skin area 7 below and between the right and left L-shaped flanges 11, 13 at the open side of each "Omega" cross section along the entire length of each of the two longitudinal stiffeners 3. Along the grid-type sandwich assemblies 4 the inner continuous composite layer 10 and the planar outer continuous composite layer 9 encompass the flat ribs 6 and are coupled to the monolithic bay portions in the openings 5. The height b of the flat rib 6 is about 8 times less than the height (in our example 22 mm) of the longitudinal stiffeners 3.

Figure 5B:
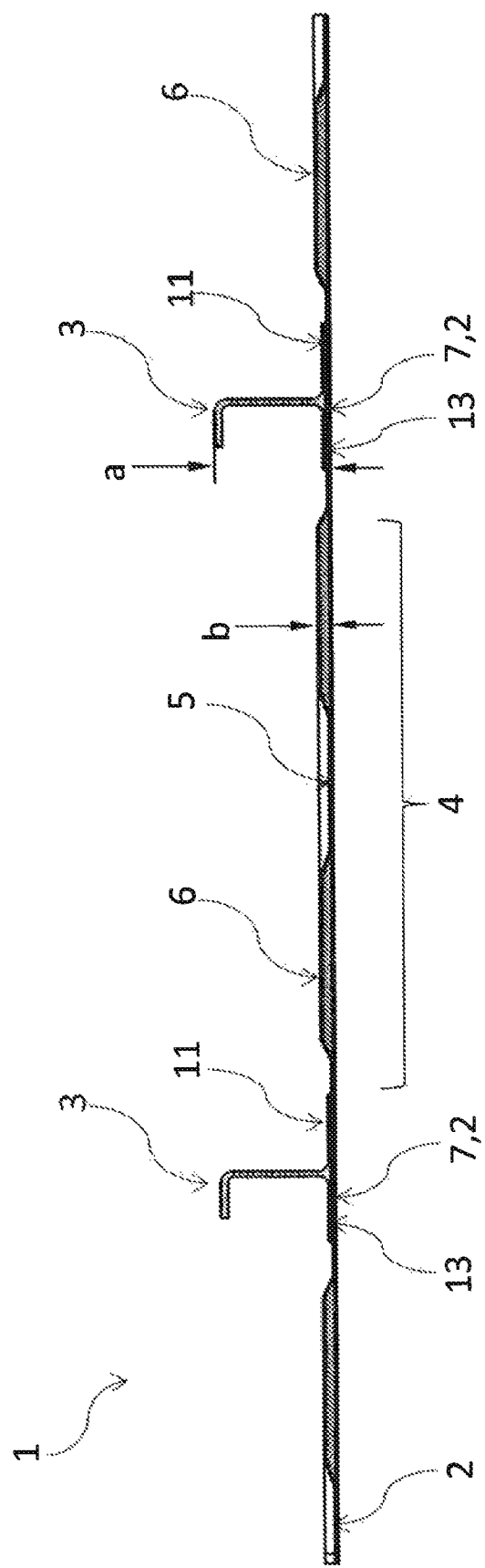
FIG. 5B shows a cross sectional view at a larger scale of a section of an alternative panel according to the invention.

According to FIG. 5B corresponding features are referred to with the references of FIG. 1-5A. The skin-stiffened panel 1 is provided with two longitudinal stiffeners 3 with "L" cross section and right and left base flanges 11, 13.

Figure 6:
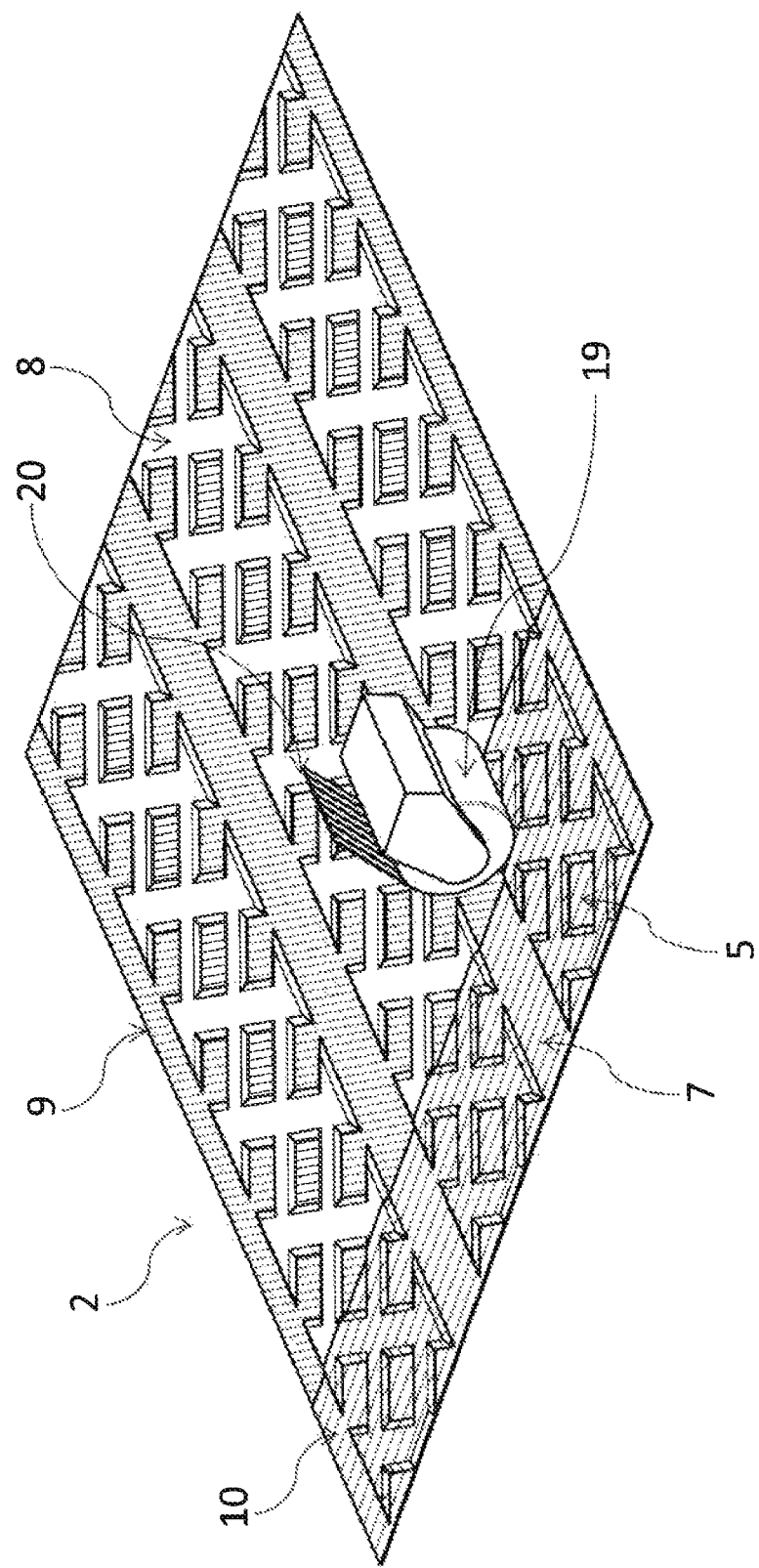
FIG. 6 shows a perspective view of the panel during a fabrication step according to the invention.

According to FIG. 6 corresponding features are referred to with the references of FIG. 1-5B. The skin 2 of the skin-stiffened panel 1 is provided by a lay-up of the inner continuous composite layer 10 on top of the foam modules 8 on the outer continuous composite layer 9. The lay-up is accomplished by means of an automatic tow-placement or automatic fiber placement process, where an elastic deformable roller 19 places and compacts pre-impregnated tows 20 onto the foam modules 8 and the outer continuous composite layer 9. The tows 20 are provided from a plurality of composite unidirectional plies of glass- and/or carbon fibers.

The roller 19 is elastic deformable and adapts to the grid-type structure and hence allows adequate draping and compaction of the tows 20 to the foam modules 8 and the outer continuous composite layer 9. The fixation of the inner and outer composite layers 10, 9 during the lay-up of the inner continuous composite layer 10 is reached even if a lack of tack between the foam modules 8 and the inner and/or outer continuous composite layers 10, 9 is present. This is due to the direct contact of both inner and/or outer continuous composite layers 10, 9 at the polygonal openings 5 through the foam modules 8.

Figure 7:
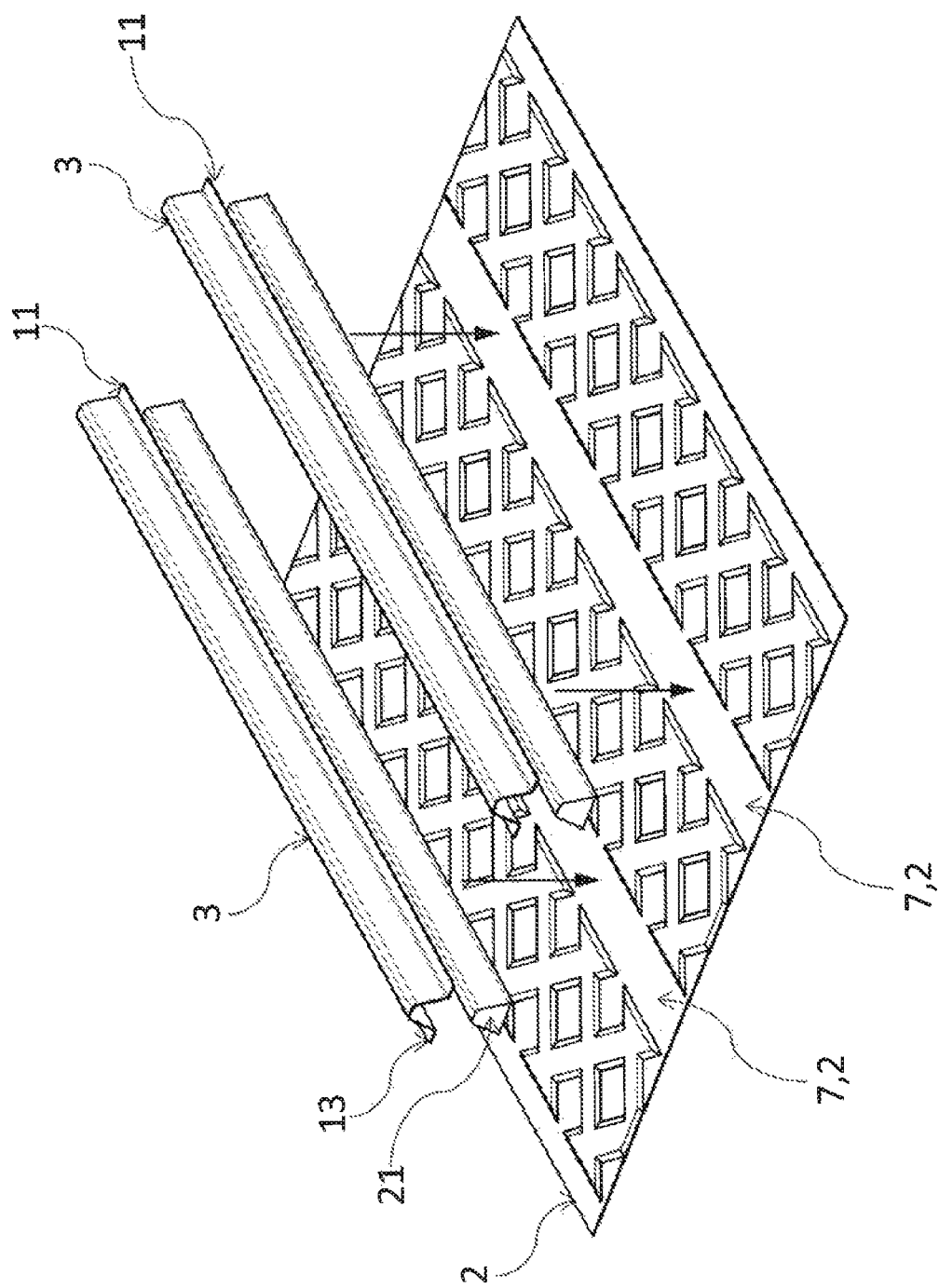
FIG. 7 shows an exploded view of the panel during a further fabrication step according to the invention.

According to FIG. 7 corresponding features are referred to with the references of FIG. 1-6. The skin-stiffened panel 1 is completed after the lay-up of the skin 2 by placing parallel preforms composed of the uncured longitudinal stiffeners 3 and a supporting mold 21 on top of the skin 2 along the interstices of longitudinal monolithic areas 7 and adhesively or cohesively bonding the longitudinal stiffeners 3 along the longitudinal monolithic skin area 7 onto the inner continuous composite layer 10 of the skin 2

REFERENCE CHARACTERS

1. Stiffened composite panel
2. Skin
3. Longitudinal stiffeners
4. Grid type sandwich assembly
5. Polygonal opening
6. Flat rib
7. Longitudinal monolithic skin area
8. Foam module
9. Outer continuous composite layer
10. Inner continuous composite layer
11. right L-shaped flange
12. First angled direction
13. left L-shaped flange
14. Second angled direction
15. Longitudinal direction
16. Chamfered edges
19. Roller
20. Prepreg tow
21. Stiffener mold

What is claimed is:

1. A skin-stiffened composite panel extending essentially along a common plane, said panel comprising:
   at least two essentially longitudinal stiffeners arranged distant to each other in said plane, said at least two essentially longitudinal stiffeners having each at least one base flange;
   a skin of a planar outer continuous composite layer and an inner continuous composite layer, the at least two essentially longitudinal stiffeners being each bonded unilaterally by means of said at least one base flange to one side of the inner continuous composite layer of the skin, wherein the at least two essentially longitudinal stiffeners have a height a perpendicular to the skin;
   at least two sandwich assemblies in said common plane along each one of the at least two essentially longitudinal stiffeners, said at least two sandwich assemblies comprising each the planar outer and the inner continuous composite layers and a foam module, with the foam modules on the same side of the planar outer continuous composite layer as the essentially longitudinal stiffeners between the inner continuous composite layer and the planar outer continuous layer and the foam modules each having a height b less than 3.5 mm, perpendicular to the planar outer continuous composite layer, the foam module having a grid-type structure with openings and flat ribs along first and second angled directions in said plane, the width c of the flat ribs being at least 5 times larger than the height b of the foam modules, the inner continuous composite layer and the planar outer continuous layer being connected to each other within the openings of the foam module and along at least two interstices between the at least two sandwich assemblies for the at least two essentially longitudinal stiffeners.

2. The panel according to claim 1, wherein the essentially longitudinal stiffeners are parallel to each other.

3. The panel according to claim 1, wherein the essentially longitudinal stiffeners are adhesively or cohesively bonded to the inner continuous composite layer.

4. The panel according to claim 1, wherein the inner continuous composite layer and the planar outer continuous layer are respectively composed of tows of a plurality of either preimpregnated or dry composite unidirectional plies.

5. The panel according to claim 1, wherein the flat ribs are oriented at 0° or 90° or 45° with respect to the essentially longitudinal stiffeners.

6. The panel according to claim 1, wherein the inner continuous composite layer and the planar outer continuous layer are directly connected to the foam modules and to each other without any additional adhesive layer.

7. A method for manufacturing a panel according to claim 1, with the following steps:
   a) providing of at least one machined foam module having a grid type structure and at least one uncured, essentially longitudinal stiffener preform with a supporting mold;
   b) providing a planar outer continuous composite layer by means of automatic fiber placement processes;
   c) unilateral placement of the foam modules on the laid-up planar outer continuous composite layer with an essentially longitudinal interstice between for the stiffener preform;
   d) automatic lay-up of the inner continuous composite layer by means of automatic fiber placement processes on top of both: the planar outer continuous composite layer and the foam modules;
   e) placement of the at least one uncured, essentially longitudinal stiffener preforms and its supporting mold on top of the inner continuous composite layer to a preliminary panel; and
   f) bagging and curing of the panel.

* * * * *